United States Patent [19]

Datta et al.

[11] 4,444,820
[45] Apr. 24, 1984

[54] HIGH DENSITY INFORMATION DISC LUBRICANTS

[75] Inventors: Pabitra Datta, Cranbury; Eugene S. Poliniak, Willingboro, both of N.J.

[73] Assignee: RCA Corporation, New York, N.Y.

[21] Appl. No.: 468,587

[22] Filed: Feb. 22, 1983

[51] Int. Cl.$^3$ ............................ G11B 3/70; B32B 3/02
[52] U.S. Cl. ........................................ 428/64; 428/65; 428/447; 346/135.1; 252/49.6; 369/276; 369/286; 369/288
[58] Field of Search ................................ 428/64, 65, 447; 346/135.1; 252/49.6; 369/276, 286, 288

[56] References Cited
U.S. PATENT DOCUMENTS

| | | | |
|---|---|---|---|
| 4,275,101 | 6/1981 | Wang et al. | 369/286 |
| 4,327,140 | 4/1982 | Preston | 428/65 |
| 4,330,583 | 5/1982 | Datta et al. | 428/65 |
| 4,340,629 | 7/1982 | Hillenbrand et al. | 428/64 |
| 4,342,659 | 8/1982 | Wang et al. | 252/49.6 |
| 4,342,660 | 8/1982 | Berry et al. | 252/49.6 |
| 4,346,468 | 8/1982 | Preston et al. | 369/276 |
| 4,346,469 | 8/1982 | Hillenbrand et al. | 369/276 |
| 4,351,048 | 9/1982 | Berry | 369/288 |
| 4,355,062 | 10/1982 | Wang et al. | 428/64 |

*Primary Examiner*—Alexander Thomas
*Attorney, Agent, or Firm*—Birgit E. Morris

[57] ABSTRACT

9-Phenylstearyl alcohol, when added to a fractionated methyl alkyl siloxane lubricant for capacitive electronic discs, improves the playback performance and surface quality of the disc.

3 Claims, No Drawings

HIGH DENSITY INFORMATION DISC LUBRICANTS

This invention relates to a lubricant additive for high density information discs. More particularly, this invention relates to a lubricant additive that improves the playback performance of high density information discs, particularly their resistance to moisture.

BACKGROUND OF THE INVENTION

U.S. Pat. No. 4,355,062 to Wang et al, herein incorporated by reference, discloses bis(hydroxyalkyl)disiloxanes useful as additives for methyl alkyl siloxane lubricants for high density information discs. The lubricant additives reduce carrier distress of the discs on playback, particularly after high temperature, high relative humidity stressing. However, this additive is very expensive.

Other lubricant additives are also known for the preferred disc lubricants, for example, hydroxylated amines, which are disclosed in U.S. Pat. No. 4,330,583 to Datta et al. These additives have the disadvantage that they are not soluble in the methyl aklyl siloxane lubricant and must be added in solution.

While these additives are effective for cleaned and dried high density information discs for imparting improved dimensional stability, particularly moisture resistance, to the discs, they are less effective for discs as pressed, i.e., that have not been processed in separate cleaning and drying steps. Since these latter steps add substantially to the time and expense of producing these discs, additives which are effective on as pressed discs to reduce carrier distress would be highly desirable.

SUMMARY OF THE INVENTION

We have discovered that 9-phenylstearyl alcohol, when added to methyl alkyl siloxane lubricants for high density information discs, reduces the carrier distress on as pressed discs as well as on cleaned and dried discs with no adverse effects on the playback performance, on stylus wear on or long term stability of the discs.

DETAILED DESCRIPTION OF THE INVENTION

9-Phenylstearyl alcohol has the formula

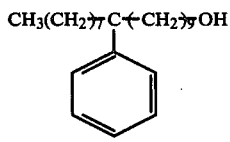

It is a polar liquid soluble in the methyl alkyl siloxane lubricants for the high density information discs which have the formula

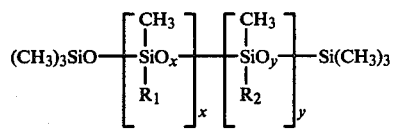

wherein $R_1$ and $R_2$ are alkyl groups of 4–20 carbon atoms, x is an integer of 2–4, y is an integer of 0–2 and the sum of x and y is 4 or less.

9-Phenylstearyl alcohol can be added to the above lubricants in varying amounts, generally about 5–20 percent by weight of the lubricant. A sufficient amount should be added to improve the carrier distress for stressed discs, but an excessive amount, such as would reduce the lubricating effect and increase stylus wear of the discs, should be avoided.

9-Phenylstearly alcohol is soluble in the methyl alkyl siloxane lubricants and thus can be applied to the surface of the discs together, either by direct application, such as by fogging or spraying, or by evaporating or spraying from a solution in a solvent such as heptane or heptane-isopropanol mixtures.

The invention will be further illustrated by the following Examples, but the invention is not meant to be limited to the details described therein. In the Examples, parts and percentages are by weight unless otherwise noted.

Carrier distress time is measured by adding the amount of time in seconds (but discounting intervals of less than 10 microseconds) during record playback when the r.f. output of the player arm is less than 150 millivolts peak to peak and the time when the r.f. output gives above 8.6 or below 3.1 megahertz in frequency, indicating a defect. Such defects are noted by the viewer as dropouts. The present acceptable level of carrier distress for a video record is three seconds in one hour of playback time.

Another test of the disc is known as the small skips test. The r.f. output of the player arm normally detects eight consecutively numbered daxi codes for each rotation of the disc. Thus if less than eight daxi codes are noted per rotation, a computer attached to the player determines the number of daxi codes missed and then computes the number of grooves skipped. The number of times during one hour of playback that eight grooves or less are skipped (one small skip event) is monitored. The present acceptable level of small skip events is 30 per one hour of playback.

EXAMPLE 1

Commercial capacitance electronic video discs were compression molded and cleaned in dilute Shipley Co. cleaning solution as described in copending application of Nyman et al, Ser. No. 091,878 filed Nov. 7, 1979 and dried in 1,1,2-trifluoro-2,2,1-trichloroethane, were lubricated by spraying from a solution of 80:20 by volume of heptane-isopropanol.

The discs were played back once and carrier distress measured. They were then stressed in a chamber held at 95 percent relative humidity and 100° F. for 1 hour and carrier distress measured again.

The Control A discs were sprayed with a 0.3 percent solution of methyl alkyl siloxane of the formula

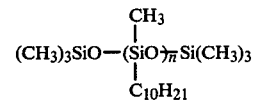

which had been molecularly distilled to obtain that fraction boiling up to 205° C.

Control B discs were sprayed with the fractionated methyl decyl siloxane containing 0.045 percent of 1,3-bis(4-hydroxybutyl)-1,3-didecyl-1,3-dimethyl disiloxane.

Example 1 discs were sprayed with 0.3 percent of the fractionated methyl decyl siloxane lubricant and 0.045 percent of 9-phenylstearyl alcohol.

Carrier distress data is summarized below in Table I.

TABLE I

| | Carrier Distress, secs./hr. | | |
|---|---|---|---|
| | Range | Median | % Pass |
| | Initial Play | | |
| Control A | 0.1–0.6 | 0.2 | 12/12 |
| Control B | 0.1–0.6 | 0.2 | 12/12 |
| Example 1 | 0.1–0.3 | 0.1 | 12/12 |
| | After Stressing | | |
| Control A | 0.2–20 | 2.5 | 6/12 |
| Control B | 0.2–1.6 | 0.3 | 12/12 |
| Example 1 | 0.1–0.6 | 0.2 | 12/12 |

EXAMPLE 2

The procedure of Example 1 was followed except that the cleaning and drying of the discs were omitted.

Example 2 discs were sprayed with a mixture containing 0.3 percent of the methyl decyl siloxane fractionated lubricant, 0.045 percent of 9-phenylstearyl alcohol and 0.03 percent of Cyastat 609, a hydroxylated amine dopant described in U.S. Pat. No. 4,330,583.

The data are summarized below in Table II.

TABLE II

| | Carrier Distress, secs./hr. | | |
|---|---|---|---|
| | Range | Median | % Pass |
| | Initial Play | | |
| Control A | 0.1–0.8 | 0.3 | 12/12 |
| Control B | 0.18–5 | 0.3 | 11/12 |
| Example 1 | 0.1–26 | 0.2 | 11/12 |
| Example 2 | 0.1–1.1 | 0.3 | 12/12 |
| | After Stressing | | |
| Control A | 22–310 | 75 | 0/12 |
| Control B | 0.88–321 | 33 | 2/12 |
| Example 1 | 0.1–25 | 2.5 | 9/12 |
| Example 2 | 0.1–1.2 | 0.3 | 12/12 |

It is apparent that the mixtures using 9-phenylstearyl alcohol were superior to known additives or the methyl decyl siloxane lubricant alone in conferring moisture resistance to as pressed discs.

CONTROL EXAMPLES 3–5

A series of video discs as in Example 2 were tested along with an undoped methyl decyl siloxane lubricant Control and the carrier distress measured after initial play and again after stressing. The data are summarized below in Table III wherein the Example 3 lubricant employed was the methyl decyl siloxane fractionated lubricant containing 10 percent of stearyl alcohol; Example 4 lubricant was the methyl decyl siloxane fractionated lubricant containing 10 percent of oleyl alcohol and Example 5 lubricant was the methyl decyl siloxane fractionated lubricant containing 10 percent of oleic acid. The Control was the methyl decyl siloxane lubricant alone.

TABLE III

| | Carrier Distress, secs./hr. | | |
|---|---|---|---|
| | Range | Median | % Pass |
| | Initial Play | | |
| Example 3 | 0.7–524 | 2.2 | 4/6 |
| Example 4 | 0.2–5.6 | 0.4 | 5/6 |
| Example 5 | 1.6–480 | 2.2 | 3/6 |
| Control | 0.4–192 | 4.4 | 3/6 |
| | After Stressing | | |
| Example 3 | 560–2730 | 926 | 0/6 |
| Example 4 | 766–2550 | 1832 | 0/6 |
| Example 5 | 6.8–240 | 30 | 0/6 |
| Control | 912–2280 | 1954 | 0/6 |

These Examples show that additives such as stearic alcohol $(CH_3(CH_2)_{16}CH_2OH$, oleyl alcohol $(CH_3(CH_2)_7CH=CH(CH_2)_8OH$ or oleic acid $(CH_3(CH_2)_7CH=CH(CH_2)_7COOH$ did not improve the carrier distress of the discs tested to an acceptable level in any case. Thus, compounds having similar structures to the 9-phenylstearyl alcohol were ineffective additives for the present lubricant system.

EXAMPLE 6

Capacitive electronic discs as prepared above were tested for short skips events. The data are summarized below in Table IV.

TABLE IV

| | Short Skips/30 min. | | | |
|---|---|---|---|---|
| | Initial Play | | After Stressing | |
| | Range | Median | Range | Median |
| Discs, washed | | | | |
| Control A | 0–64 | 7 | 1–168 | 24 |
| Control B | 0–73 | 6 | 0–542 | 11 |
| Example 1 | 0–43 | 3 | 0–57 | 5 |
| Discs, As Pressed | | | | |
| Control A | 0–16 | 6 | 0–90 | 14 |
| Control B | 0–79 | 12 | 0–101 | 17 |
| Example 1 | 0–79 | 11 | 0–91 | 10 |
| Example 2 | 0–20 | 6 | 0–25 | 6 |

It is apparent that the present dopant additives improve the disc playback on both cleaned and dried and on as pressed discs over prior art lubricant systems.

We claim:

1. In a capacitive electronic disc having a methyl alkyl siloxane lubricant coating thereon, the improvement wherein said lubricant includes an effective amount of 9-phenylstearyl alcohol as a dopant.

2. A disc according to claim 1 wherein the dopant additionally includes a hydroxylated amine dopant.

3. A disc according to claim 1 wherein the dopant is present in an amount between about 5 and 20 percent by weight of the lubricant.

* * * * *